United States Patent [19]
Minami

[11] Patent Number: 5,731,869
[45] Date of Patent: Mar. 24, 1998

[54] OPTICAL FIBER TESTING METHOD FOR MEASURING CONNECTION LOCATION AND CONNECTION LOSS

[75] Inventor: Takao Minami, Tokyo, Japan

[73] Assignee: Ando Electric Co., Ltd., Tokyo, Japan

[21] Appl. No.: 672,565

[22] Filed: Jun. 28, 1996

[30] Foreign Application Priority Data

Jun. 30, 1995 [JP] Japan .................................. 7-166572

[51] Int. Cl.$^6$ .................................................. G01N 21/88
[52] U.S. Cl. ................................................... 356/73.1
[58] Field of Search ........................................ 356/73.1

[56] References Cited

U.S. PATENT DOCUMENTS 5,129,721  7/1992  Sakamoto et al. ............... 356/73.1
5,365,328  11/1994  Anderson ........................ 356/73.1
5,528,356  6/1996  Harcourt ......................... 356/73.1

FOREIGN PATENT DOCUMENTS 5-79134  11/1993  Japan .

*Primary Examiner*—Vincent P. McGraw
*Attorney, Agent, or Firm*—Finnegan, Henderson, Farabow, Garrett & Dunner, L.L.P.

[57] ABSTRACT

In an optical fiber testing method, light are supplied to a measuring optical fiber so that return light, consisting of back-scattering light and Fresnel-reflection light, is outputted from the measuring optical fiber. A waveform representing the return light is used to perform testing of the measuring optical fiber. Herein, a detection range of the waveform used for detection of connections is defined and is partitioned into a plurality of regions in connection with Fresnel-reflection space. Then, at least a noise index and a constant are calculated for each region; and HOUGH conversion is performed on each region of the waveform. In addition, a center-value filtering process is performed, using the constant, with respect to each region of the waveform to create a filtered waveform. Further, a mean difference process is performed on the filtered waveform to create a mean difference waveform. A location of a temporary connection is set at a specific location of the mean difference waveform whose level exceeds a predetermined range. Approximate lines are calculated with respect to a left-side section and a right-side section of the temporary connection on the mean difference waveform. A connection loss is calculated for the temporary connection based on the approximate lines. Then, a decision is made, based on the connection loss, as to whether or not the temporary connection indicates a real connection. Thus, it is possible to automatically detect locations of connections and connection loss with high precision.

5 Claims, 12 Drawing Sheets

| NOISE INDEX NS ($\times 10^{-2}$dB) | NUMBER OF DATA FOR CENTER-VALUE FILTERING PROCESS NF | NUMBER OF DATA FOR MEAN DIFFERENCE PROCESS NB | DETECTION LEVEL KB |
|---|---|---|---|
| 0.02 OR LESS | 10 | 10 | 0.01 |
| 0.06 | 10 | 10 | 0.02 |
| 0.10 | 10 | 10 | 0.03 |
| 0.20 | 10 | 10 | 0.04 |
| 0.30 | 15 | 20 | 0.04 |
| 0.40 | 15 | 30 | 0.05 |
| 0.50 | 20 | 40 | 0.05 |
| 0.60 | 20 | 50 | 0.06 |
| 0.70 | 20 | 60 | 0.06 |
| 0.80 | 20 | 70 | 0.07 |
| 0.90 | 20 | 80 | 0.07 |
| 1.00 | 25 | 100 | 0.08 |
| 1.20 | 25 | 120 | 0.08 |
| 1.40 | 25 | 140 | 0.09 |
| 1.60 | 25 | 150 | 0.09 |
| 1.80 | 25 | 160 | 0.10 |
| 2.00 | 25 | 180 | 0.10 |
| 2.40 | 25 | 200 | 0.11 |
| 2.80 | 30 | 220 | 0.12 |
| 3.20 | 30 | 240 | 0.13 |
| 3.60 | 30 | 260 | 0.14 |
| 4.00 | 30 | 280 | 0.15 |
| 6.00 OR LESS | 40 | 300 | 0.15 |
| 6.00 OR MORE | 40 | 500 | 0.20 |

OPTICAL FIBER TESTING METHOD FOR MEASURING CONNECTION LOCATION AND CONNECTION LOSS

BACKGROUND OF THE INVENTION

1. Field of the Invention

The invention relates to optical fiber testing methods which measure connection loss and locations of connections with respect to optical fibers.

2. Prior Art

Figure 13:
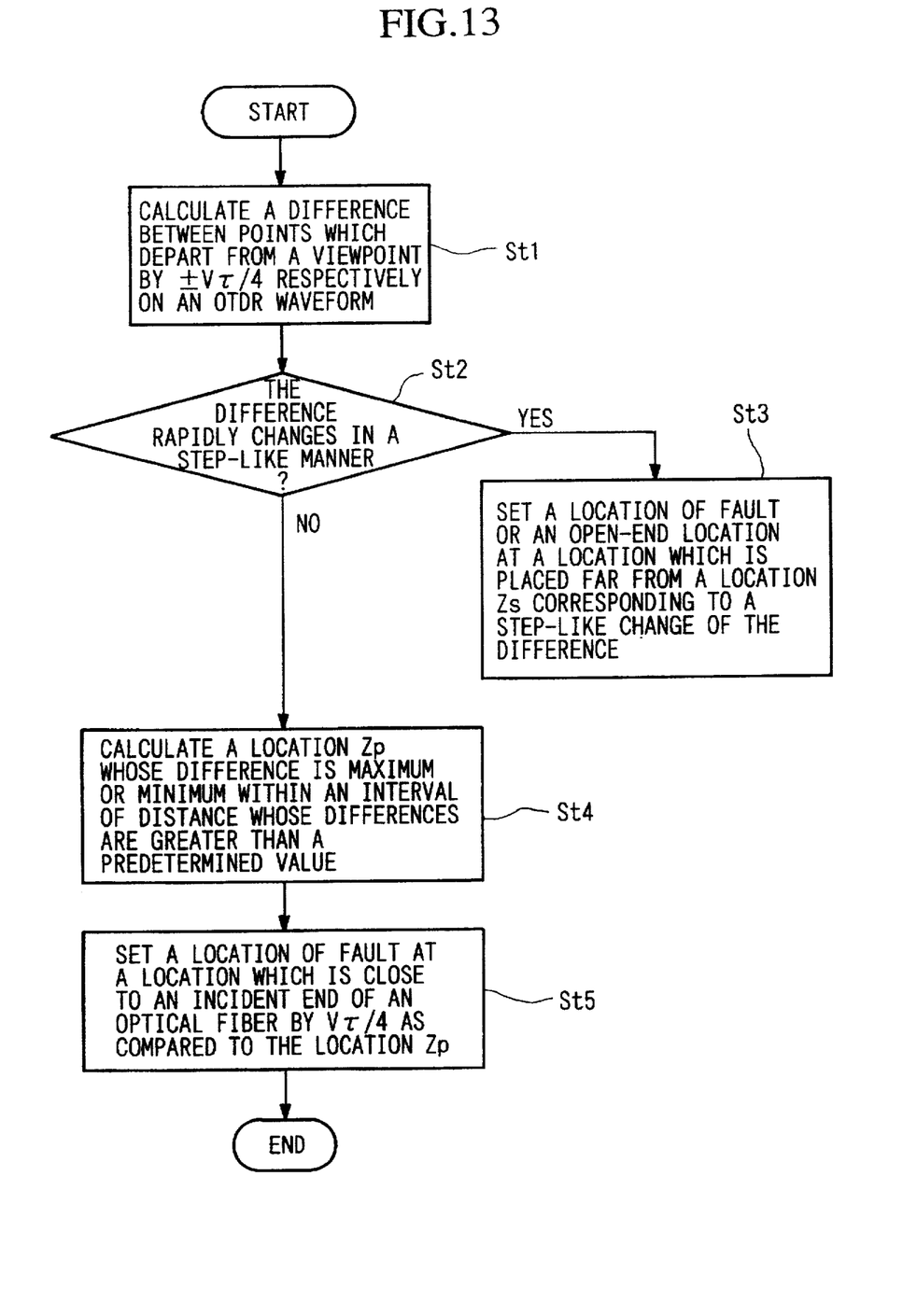
FIG. 13 is a flowchart showing the optical fiber testing method conventionally known.

Conventionally, a variety of methods are provided to automatically detect locations of connections of optical fibers as well as locations of faults of optical connectors or optical amplifiers. One method is disclosed by the paper of Japanese Patent Publication No. 5-79134, entitled "Detection Method For Locations of Faults and Locations of Open Ends of Optical Fibers", for example. FIG. 13 is a flowchart showing an example of the method conventionally known.

In first step St1 of the flowchart of FIG. 13, two points are set with respect to a specific viewpoint in a OTDR waveform (or a return-light waveform). Herein, the viewpoint serves as a center point, from which the two points depart by $\pm V\tau/4$ respectively. Then, a difference between the points is calculated. In next step St2, a decision is made as to whether the difference rapidly changes in a step-like manner.

If the step St2 determines that the difference rapidly changes, program control goes to step St3 wherein a location of fault is set at a location which is far from a location 'Zs' by $V\tau/4$. Herein, the difference rapidly changes in a step-like manner at the location Zs.

If the step St2 determines that the difference does not rapidly change, program control goes to step St4 wherein a location 'Zp' is determined within a space of distance, differences of which are greater than a predetermined value. The difference becomes maximum or minimum at the location Zp within the interval of distance. In step St5, a location of fault is set at a location which is placed close to an incident end of an optical fiber by $V\tau/4$ as compared to the location Zp.

The conventional method shown by FIG. 13 can be described as follows:

An optical pulse tester is used to measure a string of data with respect to an optical fiber. A difference is calculated between points in each of intervals of distance which are set arbitrarily. Thus, a string of difference data are calculated, wherein a data block whose data are greater than a predetermined value is extracted. Then, a peak point is searched in the data block. Based on the peak point, it is possible to presume a singular point representing a location of connection and a location of fault with respect to an optical fiber.

Other than the above method, there are provided a variety of methods. One method performs a differentiation process instead of a difference process; and another method differentiates data after the difference process.

The aforementioned methods are designed to detect connections without eliminating noise components in waveforms. So, those methods can accurately detect the connections with respect to waveforms whose noise components are relatively less. In a normal waveform, however, there is a great chance that a detection error may occur due to noise effects. Further, the aforementioned methods cannot detect connections if connection loss is approximately equivalent to propagation loss which is caused by deterioration of waveform due to background noise.

In addition, noise becomes greater approximately in proportion to a distance even if a waveform does not change substantially. For this reason, methods which process data using same conditions may not be suitable as optical fiber testing methods.

Moreover, a derivative waveform becomes great in level at a section where Fresnel's reflection occurs or at a section where a relatively great amount of noise occurs. So, even in the method which performs the differentiation process, it is difficult to perform the process with distinguishing those sections. As a result, the method may mistakenly detect the noise instead of the Fresnel's reflection.

The OTDR waveform as a whole has a certain gradient. So, it is difficult to set a reference value for the method using the difference process.

SUMMARY OF THE INVENTION

It is an object of the invention to provide an optical fiber testing method which is capable of automatically measuring locations of connections and connection loss, which are searched between a near end and a terminal end of an optical fiber, with automatically set optimum detection conditions.

According to an optical fiber testing method of the invention, light pulses are supplied to a measuring optical fiber so that return light, consisting of back-scattering light and Fresnel-reflection light, is outputted from the measuring optical fiber. A waveform representing the return light is used to perform testing of the measuring optical fiber. Herein, a detection range of the waveform used for detection of connections is defined by a start point and an end point, which correspond to a near end and a terminal end of the measuring optical fiber, respectively. The detection range of the waveform is partitioned into a plurality of regions in connection with Fresnel-reflection space. Then, at least a noise index and a constant are calculated for each region; and HOUGH conversion is performed on each region of the waveform. In addition, a center-value filtering process is performed, using the constant, with respect to each region of the waveform to create a filtered waveform. Further, mean difference process is performed on the filtered waveform to create a mean difference waveform.

Next, a location of a temporary connection is determined at a specific location of the mean difference waveform whose level exceeds a predetermined range. Approximate lines are calculated with respect to a left-side section and a right-side section of the temporary connection on the mean difference waveform. So, a connection loss is calculated for the temporary connection based on the approximate lines. Then, a decision is made, based on the connection loss, as to whether or not the temporary connection indicates a real connection.

Thus, testing is performed on the measuring optical fiber from its near end to its terminal end, so that locations of connections and connection loss are automatically detected with high precision.

BRIEF DESCRIPTION OF THE DRAWINGS

These and other objects of the subject invention will become more fully apparent as the following description is read in light of the attached drawings wherein.

DESCRIPTION OF THE PREFERRED EMBODIMENT

[A] Configuration of Optical Fiber Testing Device

Figure 1:
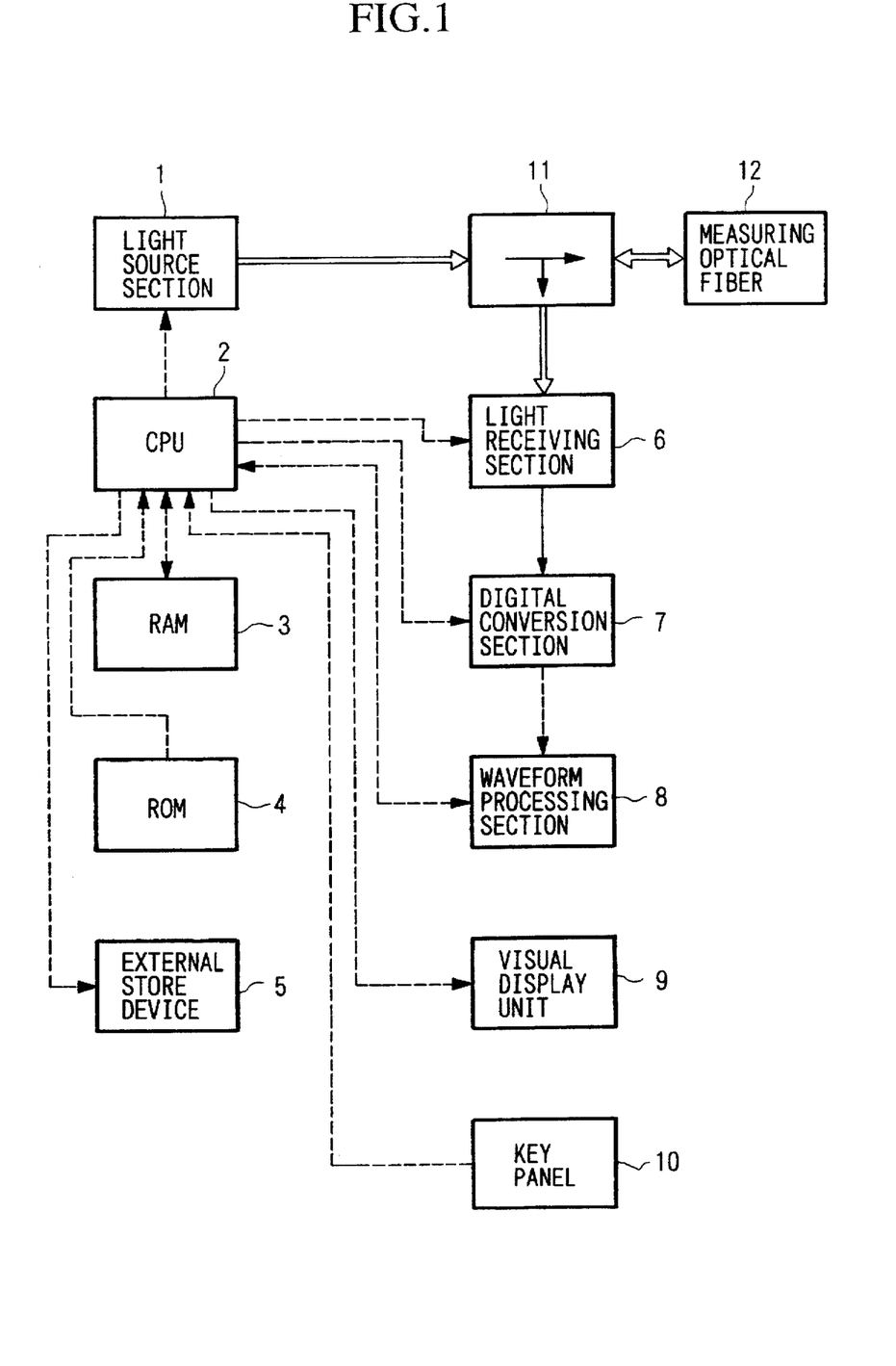
FIG. 1 is a block diagram showing a configuration of an optical fiber testing device which is designed to employ an optical fiber testing method of the invention.

FIG. 1 is a block diagram showing a configuration of an optical fiber testing device which can employ an optical fiber testing method of the invention. In FIG. 1, a light source section 1 is constructed by a laser diode to radiate light pulses, which are supplied to a measuring optical fiber 12 through a directional connector 11.

In FIG. 1, solid lines designate transmission of analog signals; double lines designate transmission of light; and dotted lines designate transmission of control signals or digital signals.

The directional connector 11 delivers the light pulses to the measuring optical fiber 12. In addition, the directional connector 11 receives return light from the measuring optical fiber 12 so as to transmit it to a light receiving section 6. Herein, the return light represents back-scattering light and Fresnel-reflection light, which will be described later.

The light receiving section 6 is constructed by a photodiode to receive the return light which is given by the measuring optical fiber 12 and is transmitted thereto through the directional connector 11. Thus, the light receiving section 6 converts the return light to electric signals.

A digital conversion section 7 performs amplification and digital conversion on the electric signals which are supplied thereto from the light receiving section 6. Thus, the digital conversion section 7 produces waveform data.

A waveform processing section 8 performs an averaging process and logarithmic conversion on the waveform data which are produced by the digital conversion section 7.

A central processing unit (i.e., CPU) 2 controls the light source section 1, the light receiving section 6, the digital conversion section 7 and the waveform processing section 8.

A random-access memory (i.e., RAM) 3 stores the waveform data which have been processed by the waveform processing section 8.

A read-only memory 4 stores procedures of processes which are executed by several sections of the optical fiber testing device of FIG. 1.

A visual display unit 9 is constructed by a cathode-ray tube (i.e., CRT) to visually display the waveform data, which are processed, as well as locations of Fresnel reflection and connection loss of connections of the measuring optical fiber 12. The content of information visually displayed on a screen of the visual display unit 9 is made in list form.

An external store device 5 is constructed by a floppy-disk drive to store the waveform data which are required.

A key panel 10 is constructed by multiple keys and is arranged at a front face of a main body of the optical fiber testing device.

By depressing the keys of the key panel 10 respectively in accordance with a work procedure for one work, it is possible to input measuring conditions representing the content of work. As the work, there are provided on/off manipulation of the light source section 1, auto-splice manipulation (i.e., automatic measurement for a location of Fresnel reflection of a waveform or a connection of the measuring optical fiber 12) and storing operation to store results of measurement in the external store device 5, for example.

[B] Procedures of Processes

Figure 2A:
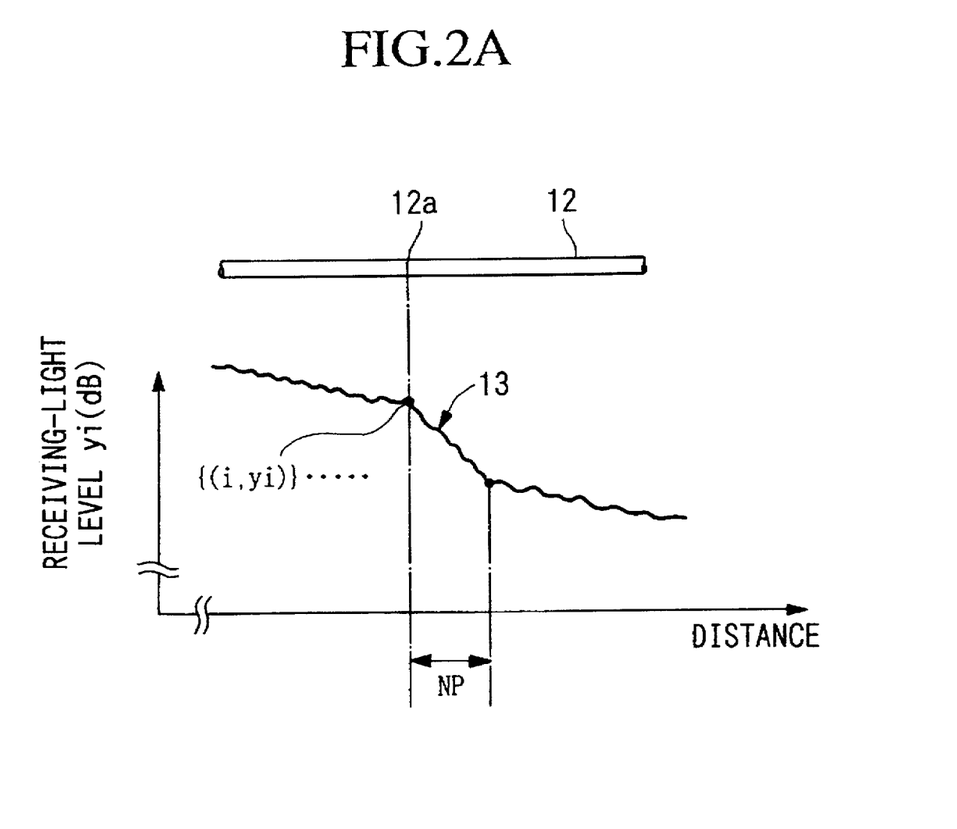
FIG. 2A is a graph showing an example of an OTDR waveform in connection with a measuring optical fiber.

Under control of the CPU 2, data representing an OTDR waveform are processed by the waveform processing section 8 and are then stored in the RAM 3. FIG. 2A shows a waveform 13 which is stored in the RAM 3. In FIG. 2A, the waveform 13 is shown by being associated with an image of the measuring optical fiber 12 having a connection 12a.

Next, the CPU 2 controls the light source section 1 to radiate a light pulse. The light pulse is supplied to an incident end of the measuring optical fiber 12 through the directional connector 11. This causes occurrence of back-scattering light and Fresnel-reflection light in the measuring optical fiber 12. An OTDR configured by the back-scattering light and Fresnel-reflection light is received by the light receiving section 6, wherein it is converted to electric signals.

The connection 12a is formed at a selected location of the measuring optical fiber, shown in FIG. 2A, by fusion. The waveform 13 is visually displayed on a screen of the visual display unit 9.

In a graph shown in FIG. 2A, a vertical axis represents a level of receiving light of a response waveform in a unit of decibel (dB); and a horizontal axis represents a distance (i.e., a length of the measuring optical fiber 12). The distance is calculated based on elapsed time of the response waveform.

The present embodiment treats OTDR-waveform data as in a form of coordinates $\{i, y(i)\}$. Herein, 'i' designates a point number which corresponds to a progression distance of the response light. As response-waveform data $y(i)$, there are provided $y(1), y(2), \ldots, y(20000)$, wherein numbers in parenthesis represent point numbers. So, the response-waveform data $y(i)$ represent a receiving-light level, corresponding to the point number i, in the unit of decibel.

Incidentally, a point i is defined as a point of distance $x(i)$ which is measured from an incident point of the measuring optical fiber 12. Herein, $x(i)$ is calculated by an equation (1), as follows:

$$x(i)=i \cdot BK \qquad (1)$$

In the equation (1), 'BK' represents distance resolution of the response light in its progression direction; therefore, BK is equal to a distance between points.

In addition, a relationship between a progression time 't' and a progression distance 'l' which relate to response light in an OTDR waveform is represented by an equation (2), as follows:

$$t=2 \cdot l/v=2 \cdot l \cdot n/c \qquad (2)$$

In the equation (2), 'v' represent a speed of light in the measuring optical fiber 12; 'n' represents a refractive index; and 'c' represents a speed of light in the vacuum.

Figure 2B:
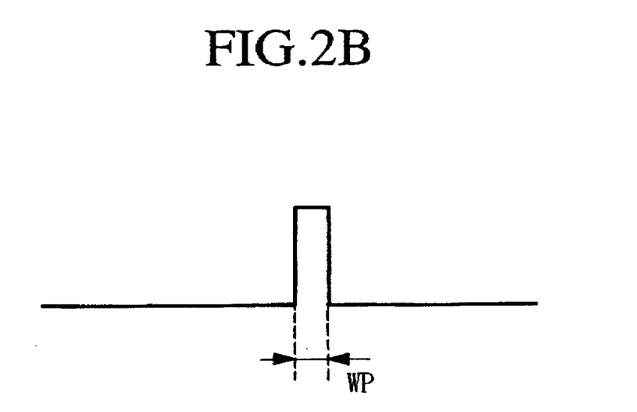
FIG. 2B shows an example of a light pulse to be inputted to the measuring optical fiber.

FIG. 2B shows a waveform of a light pulse which is radiated by the light source section 1. Herein, 'WP' represents a pulse width of the light pulse.

In order to perform measurement on the connection 12a with a high precision, the pulse width WP of the light pulse should be narrowed. However, if the pulse width WP is narrowed, an OTDR waveform should be damped, so that a precision of measurement is lowered.

So, the present embodiment determines an optimum pulse width, by which a highest precision of measurement can be obtained, in advance.

The waveform 13 shown in FIG. 2A is declining by a certain gradient from the incident point of the measuring optical fiber 12. A declining gradient changes at the connection 12a. Then, the declining gradient is returned to an original declining gradient if the response waveform progresses by a certain distance from the connection 12a. 'NP' represents a number of points within an interval of distance in which the declining gradient departs from the original declining gradient.

In the present embodiment, the pulse width WP of the light pulse is placed as the progression time t of the response waveform while the number of points NP, which belong to an interval of distance corresponding to the connection 12a of the measuring optical fiber 12, is used as the progression distance 1. Thus, the aforementioned equation (2) is rewritten as an equation (3) which provides calculation for the pulse width WP, as follows:

$$WP=2 \cdot BK \cdot NP \cdot n/c \qquad (3)$$

By further expanding the equation (3) with respect to the number of point NP, it is possible to obtain an equation (4), as follows:

$$NP=WP \cdot c/(2 \cdot n \cdot BK) \qquad (4)$$

A certain set of numerical values can be set for constants and variables used in the equation (4), wherein the pulse width WP is set at 1000 ns; the speed of light c is set at $3 \times 10^8$ m/s; an average value for the refractive index n is set at 1.46; and the distance resolution BK is set at 4 m (which indicates that one data correspond to a distance of 4 m), for example. In that case, a result of calculation of equation (4) shows "NP=25.7". Naturally, however, the number of points NP should be an integer. So, the above result is interpreted that the number of points NP is 26.

In general, a light pulse inputted to the measuring optical fiber 12 does not perfectly coincide with an ideal rectangular wave shown by FIG. 2B. In addition, when the light pulse propagates through the measuring optical fiber 12, a pulse width of the light pulse should be broadened due to wavelength dispersion phenomenon. So, if the pulse width of the light pulse is relatively narrow, in many cases, result of calculation of the equation (4) does not coincide with an actual pulse width.

That is, as a location of a connection is made closer to a terminal end of the measuring optical fiber 12, a number of points NP becomes large.

On the basis of the reasons described above, the present embodiment uses the equation (4) to calculate the number of points NP if NP is equal to or greater than 16; however, the present embodiment uses a numerical value of 15 for the number of points NP as long as NP is equal to or less than 15.

Figure 3:
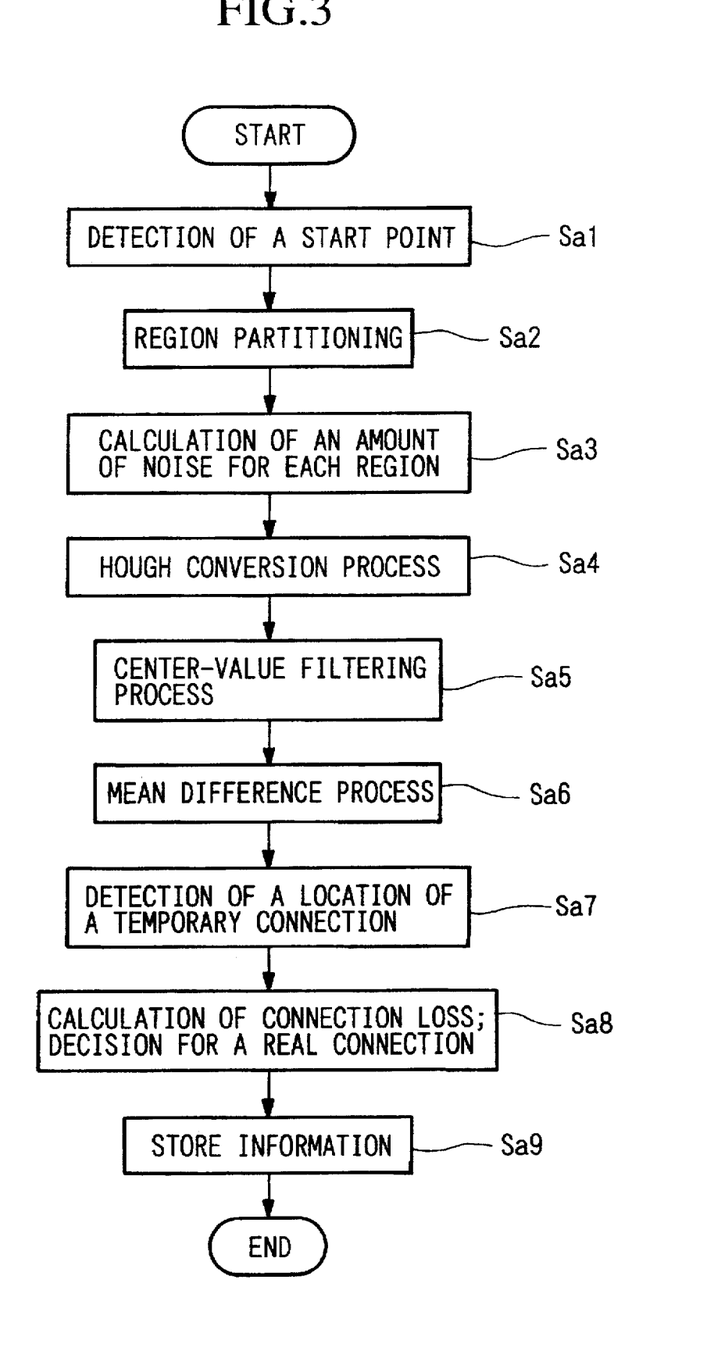
FIG. 3 is a flowchart showing procedures for an optical fiber testing method in accordance with an embodiment of the invention.

FIG. 3 is a flowchart which is used to explain an optical fiber testing method in accordance with an embodiment of the invention. Processes shown in FIG. 3 are performed by the CPU 2 based on the control programs stored in the ROM 4. When the CPU 2 receives a 10-detection start command from the key panel 10 which is manipulated by a human operator, the CPU 2 reads out the control programs from the ROM 4 to start execution of the processes of FIG. 3.

Figure 4A:
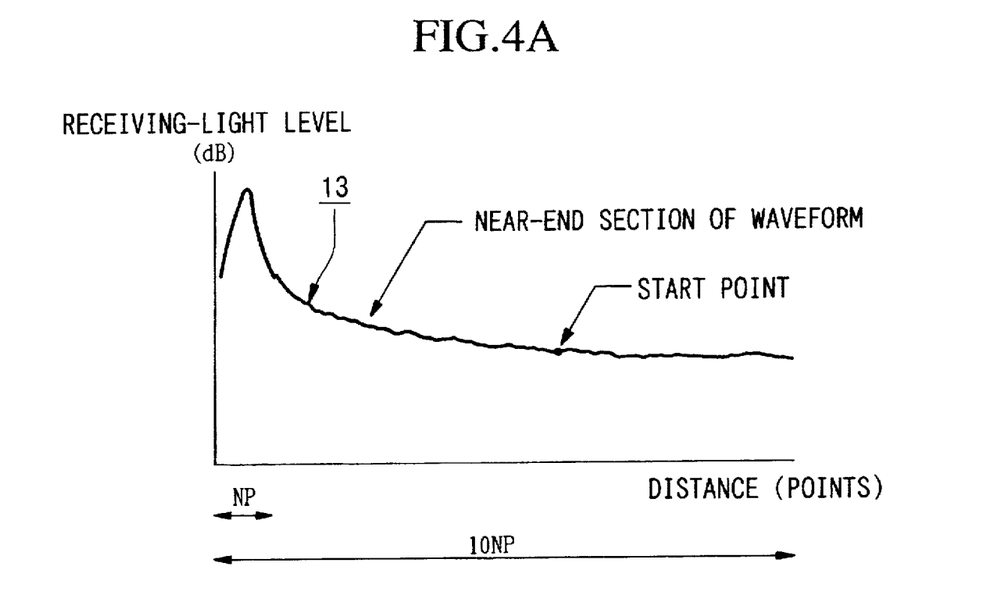
FIG. 4A is a graph showing a waveform which is stored in a RAM shown in FIG. 1.
Figure 4B:
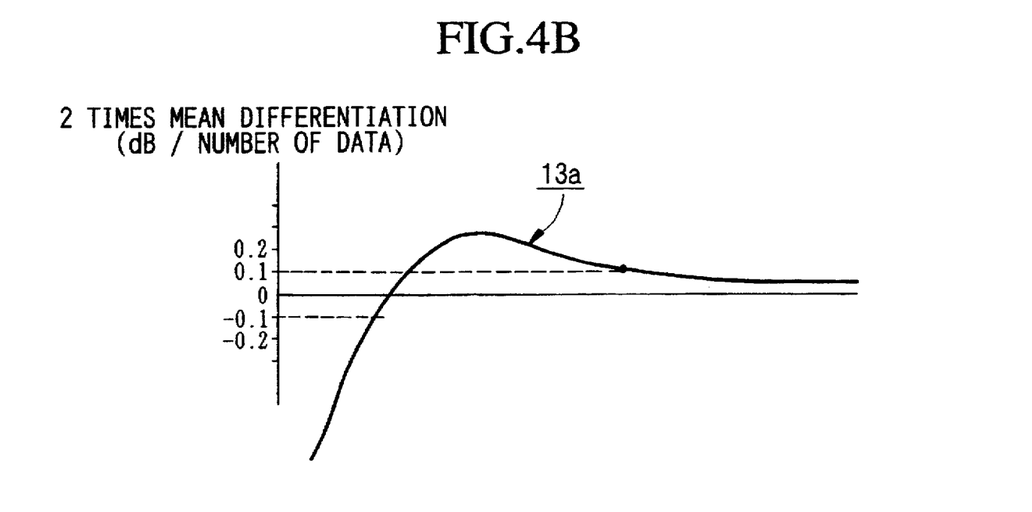
FIG. 4B shows a selected part of a waveform which is obtained by performing mean differentiation process 2 times on the waveform of FIG. 4A.

The CPU 2 uses a data range corresponding to a certain number of points which is represented by '10·NP'. In step Sa1, the CPU 2 designates a start point 'STA' within the above data range. FIGS. 4A and 4B are used to explain a method of designating the start point STA. Herein, FIG. 4A shows an example of the waveform 13 which is stored in the RAM 3. In step Sa1, the CPU 2 performs a differentiation calculation on the waveform 13 in accordance with an equation (5), as follows:

$$DIV(k)=\{\Sigma_p{}^A y(p)+\Sigma_q{}^B y(q)-2\Sigma_r{}^C y(r)\}/N \qquad (5)$$

where p=k, q=k+2N, r=k+N while A=k+N-1, B=k+3N-1, C=k+2N-1. Calculations are performed in accordance with the above equation (5), wherein a natural number, which is the closest within natural numbers close to 'NP/3', is placed into 'N'; and a value of 'k' is sequentially increased by one from 'N' to '10·NP'.

Namely, average differentiation calculation is performed on the waveform 13 by 2 times. Thus, it is possible to obtain a waveform 13a shown in FIG. 4B. The start point STA is set at a point at which level of the waveform 13a becomes less than 0.1 dB.

Figure 5:
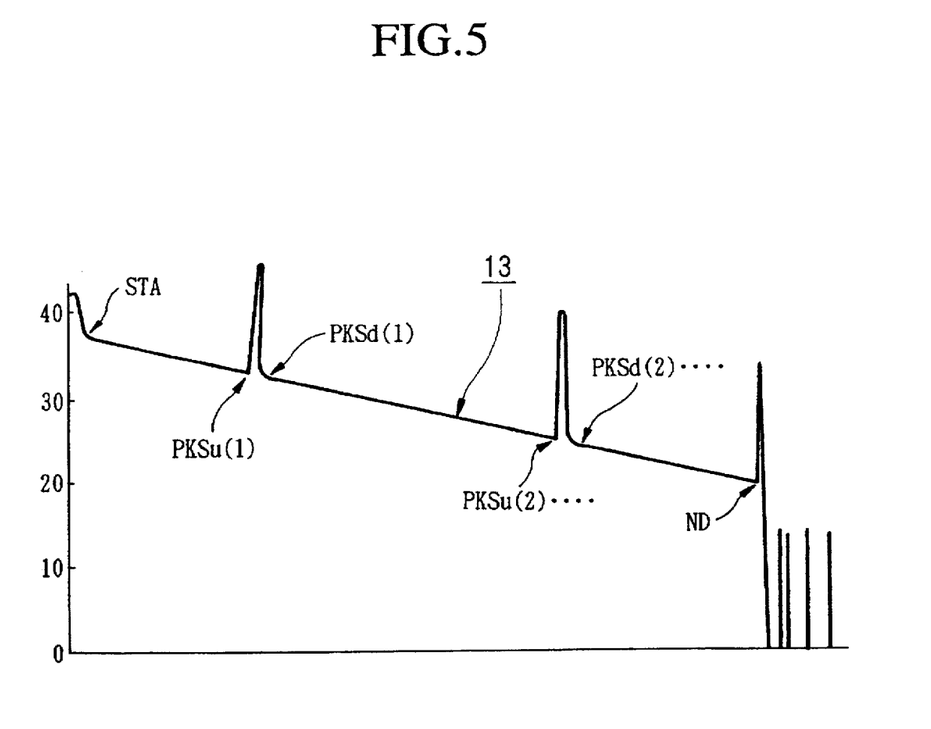
FIG. 5 is a graph showing an example of a waveform which is stored in the RAM.

Like FIG. 4A, FIG. 5 shows an example of the waveform 13 which is stored in the RAM 3. As compared to the waveform shown in FIG. 4A, the waveform of FIG. 5 is shown by a longer time range. Fresnel-reflection space is represented by a pair of points PKSu(1) and PKSd(1), a pair of points PKSu(2) and PKSd(2), . . . respectively. 'ND' designates an end point of the waveform 13.

The CPU 2 uses a certain range of the waveform 13, which exists between the start point STA and the end point ND but which excludes the Fresnel-reflection space, as a connection detection range. The waveform 13 may contain some sections which contain much noise and other sections which contain less noise. So, if detection is performed on all the connection detection ranges of the waveform 13 by same conditions, there is a great chance that detection error occurs.

Therefore, the connection detection range, which is relatively broad, is partitioned into multiple regions in step Sa2. In this step Sa2, the connection detection range is partitioned into some regions if the connection detection range exceeds a certain range which corresponds to 3000 points, for example. Then, a serial number is assigned to each region.

In case of the waveform 13 of FIG. 5, there exist three connection detection ranges, as follows:

Range 1: STA–PKSu(1)

wherein "Range 1" exists between a point 50 and a point 4800, an interval of which is 4750 points.

Range 2: PKSd(1)–PKSu(2)
    wherein "Range 2" exists between a point 4830 and a point 12800, an interval of which is 7970 points.

Range 3: PKSd(2)–ND
    wherein "Range 3" exists between a point 12830 and a point 18320, an interval of which is 5490 points.

In the above, each range exceeds 3000 points. So, Range 1 is partitioned into 2 regions; Range 2 is partitioned into 3 regions; and Range 3 is partitioned into 2 regions. Thus, each of the regions partitioned has a certain range which is less than 3000 points. Data included in the regions are expressed, as follows:

Region 1: $\{i_1, y(i_1)\} - \{i_1+N_1, y(i_1+N_1)\}$

Region 2: $\{i_2, y(i_2)\} - \{i_2+N_2, y(i_2+N_2)\}$

Region m: $\{i_m, y(i_m)\} - \{i_m+N_m, y(i_m+N_m)\}$

Next, the CPU 2 proceeds to step Sa3 wherein the CPU 2 calculates a noise index with respect to each of the regions partitioned by the step Sa2. For example, a noise index is calculated with respect to a Region j, as follows:

Region j: $\{i_j, y(i_j)\} - \{i_j+N_j, y(i_j+N_j)\}$ $$NS(j) = \{\Sigma_k^D |y(k)+y(k+2)-2y(k+1)|\}/(N_j-1) \quad (6)$$

where $D=i_j+N_j-2$ and $k=i_j$. In the above equation (6), 'k+1' can be replaced by 'k+K' while 'k+2' can be replaced by 'k+2·K' where 'K' is a natural number arbitrarily selected. Even in such replacement, result of calculation of the equation (6) remains the same.

Based on the noise index NS, it is possible to determine constants NF, NB and KB. Herein, NF designates a number of data, within a region, which are subjected to center-value filtering process; NB designates a number of data which are subjected to mean deviation process; and KB designates a threshold value for detection of a temporary connection.

Figure 6:
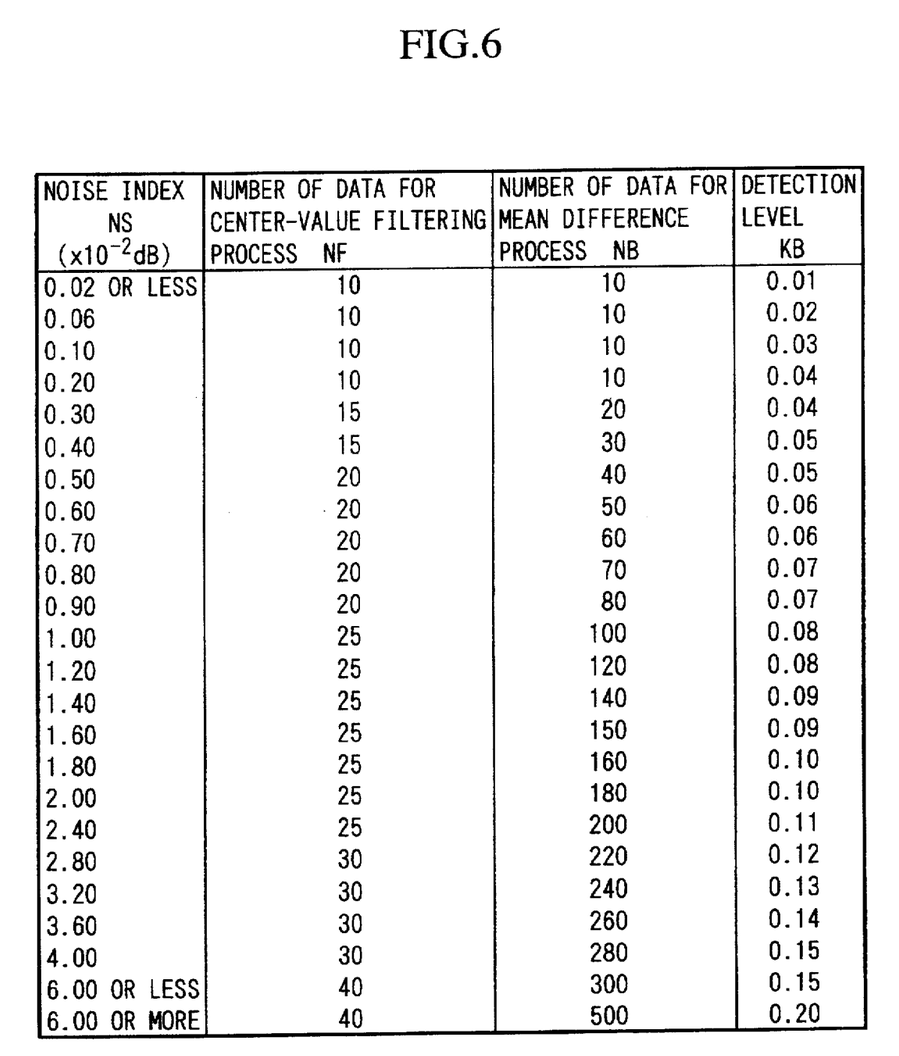
FIG. 6 shows an example of relationship among constants NF, NB and KB in connection with a noise index NS.

FIG. 6 shows an example of relationship among the constants NF, NB and KB with respect to the noise index NS. As shown by FIG. 6, the constants are increased larger as the noise index NB becomes larger. Because, elimination of noise should be made more intense for a portion of waveform whose noise index is relatively large.

Next, the CPU 2 proceeds to step Sa4 in which HOUGH conversion is performed. Herein, the CPU 2 calculates a HOUGH-conversion angle based on an approximate line which is created for the waveform 13 with respect to each region. The CPU 2 performs the HOUGH conversion on all data $y(i_j)$ for $y(i_j+N_j)$ in accordance with an equation, as follows:

$$z(k) = y(k) + (k-i_j) \cdot a_j \quad (7)$$

In the above equation (7), '$a_j$' designates a gradient of an approximate line calculated for the region j.

Figure 7A:
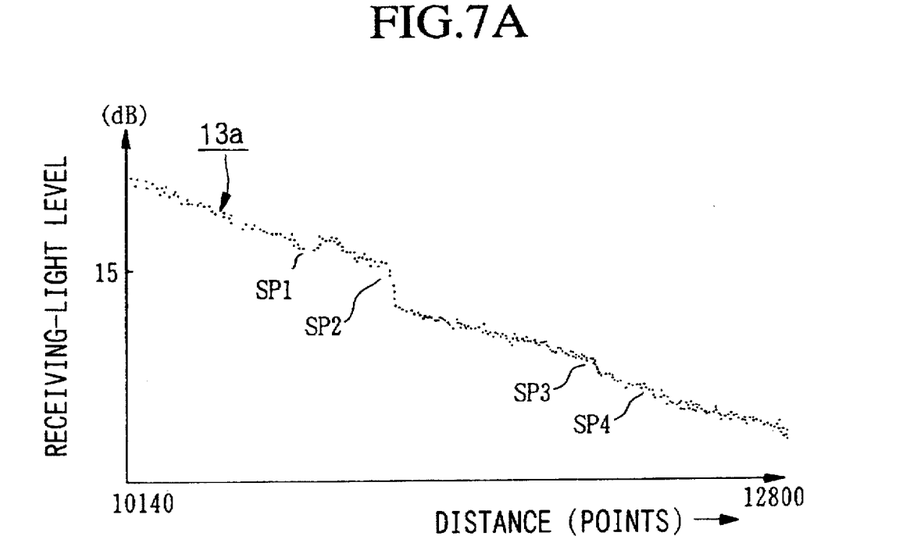
FIG. 7A is a graph showing an original waveform.
Figure 7B:
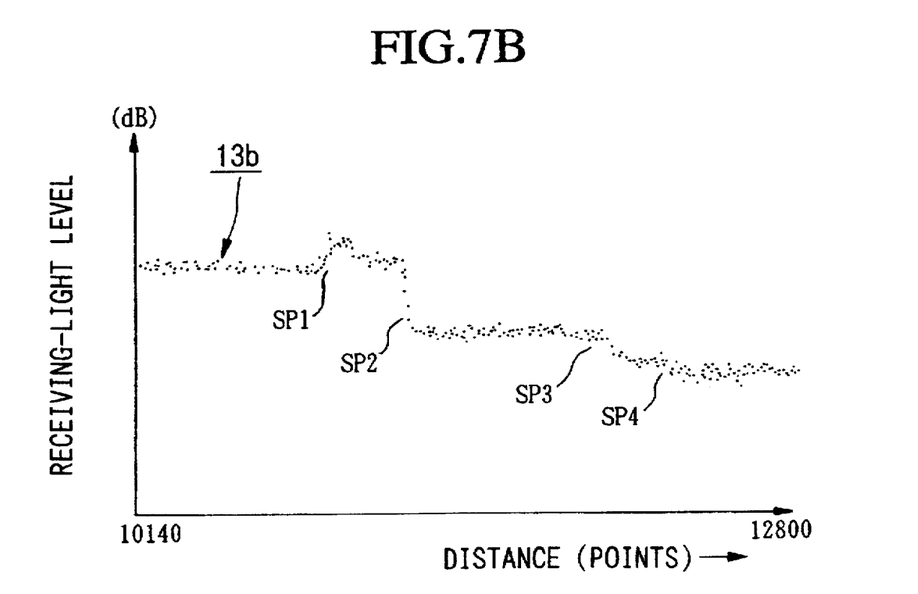
FIG. 7B is a graph showing a waveform which is obtained by performing HOUGH conversion on the original waveform of FIG. 7A.

FIG. 7A shows an example of an original waveform 13a while FIG. 7B shows an example of a waveform 13b after the HOUGH conversion.

Next, the CPU 2 proceeds to step Sa5 so as to determine the constant NF which designates a number of data subjected to the center-value filtering process. If the noise index NS is set at $0.15 \times 10^{-2}$, for example, it is possible to read "NF=10" from FIG. 6.

In addition, the CPU 2 converts data 'z(k)' to 'w(k)' by the center-value filtering process. In this case, a center value, whose number is 'k', is set to extract data thereof; and 10 data are extracted from each of a left-side area and a right-side area of the center value. Thus, 21 total data are extracted as the objective to be processed.

Namely, 21 data, which exist between data z(k−10) and data z(k+10), are sorted in an order which starts from a smallest one. Then, data whose number is '11' within the 21 data sorted are converted to w(k).

The above process is performed with respect to all data whose numbers are existing between '$i_j$' and '$i_j+N_j$'. That is, a value of k is first set at a number '$i_j+10$' so that the process is performed. Then, the process is repeated with respect to another value of k which is set by sequentially shifting the above number in a right direction. Thereafter, the process is repeated until the value of k reaches '$i_j+N_j-10$'. However, 21 data are not appropriate for the process performed on both ends of regions which are represented by '$i_j \rightarrow i_j+10$' and '$i_j+N_j-10 \rightarrow i_j+N_j$' respectively. So a number of data to be processed is reduced for the both ends of the regions.

Figure 8:
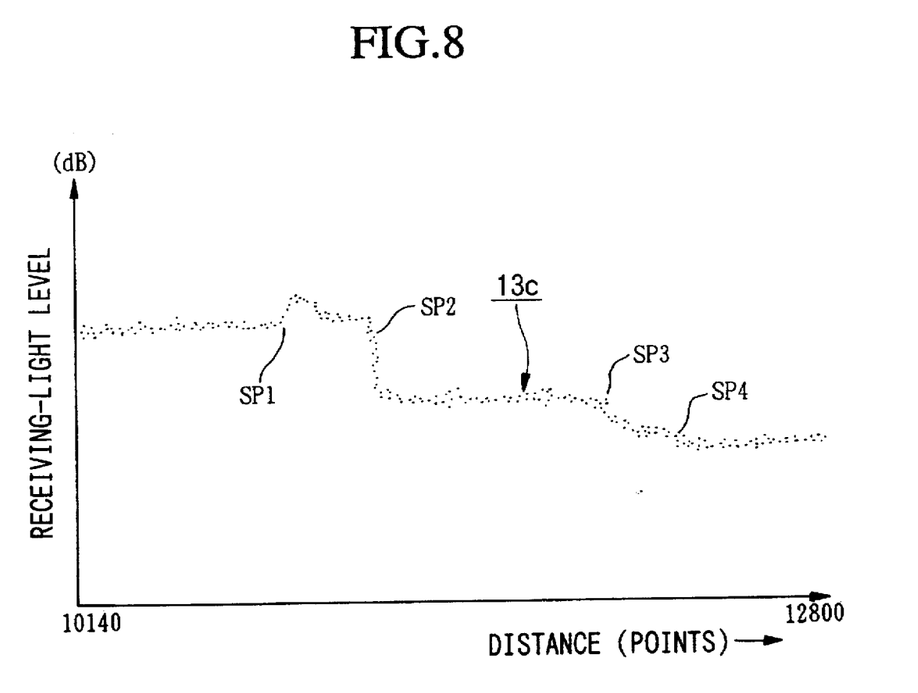
FIG. 8 is a graph showing a filtered waveform which is obtained by performing center-value filtering process on the waveform of FIG. 7B.

FIG. 8 shows an example of a filtered waveform 13c which is obtained by performing the center-value filtering process on the waveform 13b of FIG. 7B.

Next, the CPU 2 proceeds to step Sa6 so as to perform mean difference process (or running mean difference process) on the data w(k) which are obtained by execution of the step Sa4 with respect to a region of '$i_j \rightarrow i_j+N_j$'. If the noise index NS is set at $0.15 \times 10^{-2}$, for example, it is possible to read "NB=15" from FIG. 6, wherein the constant NB designates a number of data subjected to the mean difference process. This value of the mean difference process is designated by a numeral 'DIF', which is calculated by an equation, as follows:

$$DIF(k) = \{\Sigma_p^k w(p) - \Sigma_q^E w(q)\}/NB \quad (8)$$

where $p=k-NB+1$ and $q=k+NP$ while $D=k+NP+NB-1$.

Figure 9A:
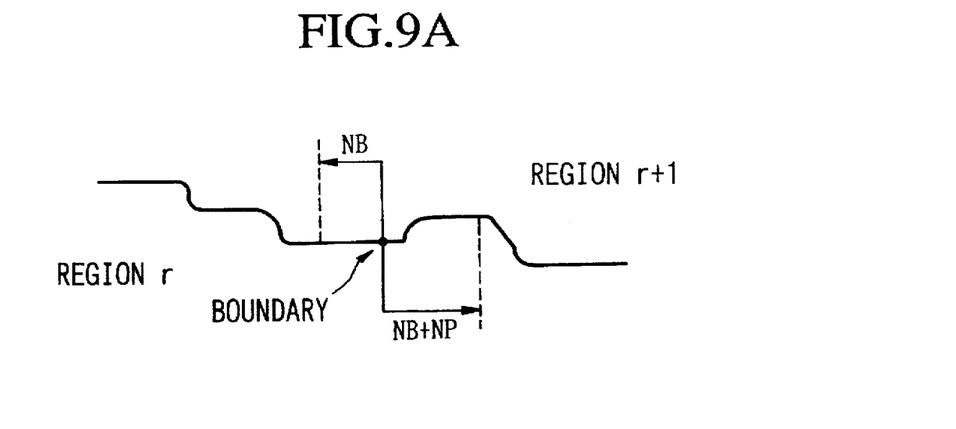
FIG. 9A, 9B and 9C show selected parts of waveforms which are used to explain preliminary process before execution of mean difference process with respect to a boundary of regions of a waveform.

In the equation (8), a value of k is sequentially increased by one from $i_j$ to $i_j+N_j$, so that the mean difference process is performed using the value of k. As for a boundary of two regions (see FIG. 9A) which are placed adjacent to each other, one region uses a number of data, which belong to another region, in addition to data thereof for the mean difference process.

Figure 9B:
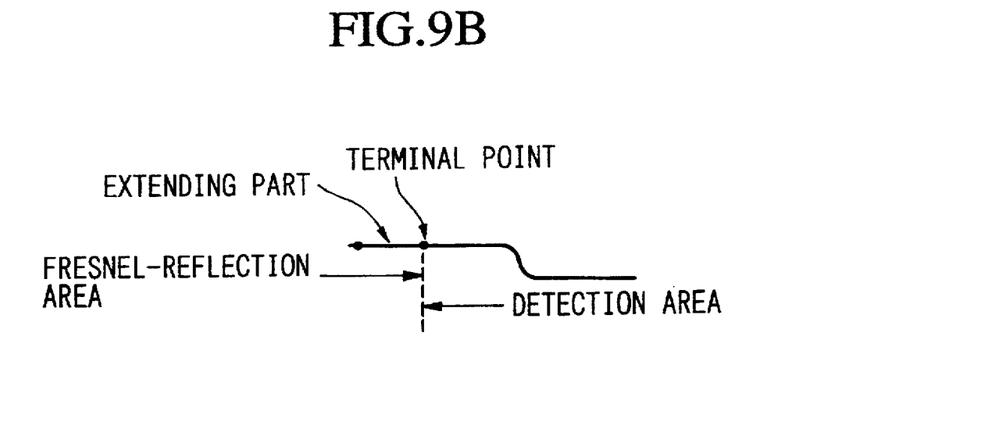
Figure 9C:
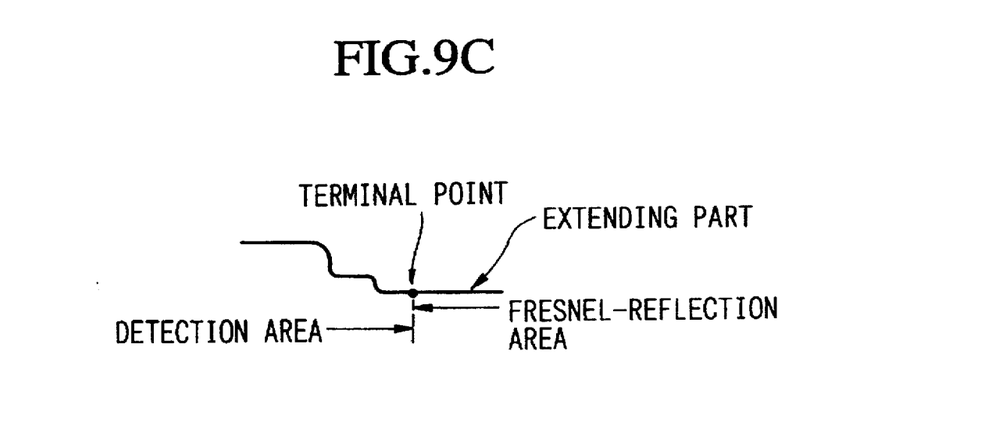

If one region is a Fresnel-reflection region, a waveform of FIG. 9B is processed to create a waveform of FIG. 9C by extending the data w(k) to a constant value.

Figure 10:
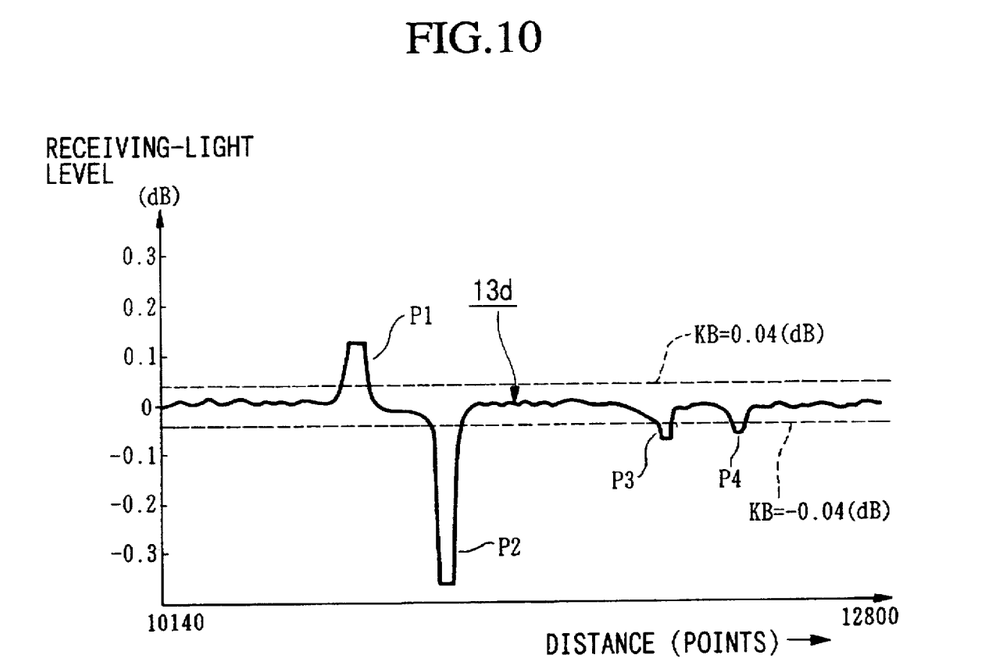
FIG. 10 is a graph showing a mean difference waveform which is obtained by performing mean difference process on the filtered waveform of FIG. 8.

By performing the mean difference process on the filtered waveform 13c of FIG. 8, it is possible to obtain a mean difference waveform 13d of FIG. 10. Herein, a mean difference, which is approximately zero, is read from the waveform of FIG. 10 in a detection area sandwiched by dotted lines. Herein, mean differences of a fall-down step difference (e.g., SP2) form a minus pattern (see P2 in FIG. 10) whilst mean differences of a rise-up step difference (e.g., SP1) form a plus pattern (see P1 in FIG. 10).

Next, the CPU 2 proceeds to step Sa7 wherein noise is eliminated from the mean difference waveform 13d of FIG. 10 after the mean difference process so as to detect a connection. Herein, the CPU 2 reads a detection level (i.e., the threshold value KB) from FIG. 6 based on the noise index NS. In the present embodiment, the detection level is made larger for the region which contains relatively much noise.

If the noise index NS is set at $0.15 \times 10^{-2}$, it is possible to read "KB=0.04" (dB) from FIG. 6, for example. Based on this value of KB, the dotted lines are drawn to represent "KB=0.04(dB)" and "KB=−0.04(dB)" respectively in FIG. 10, so that a range of KB is set between the dotted lines. So, it is possible to detect patterns of the waveform 13d (i.e., a mean difference waveform DIF(k)) which depart from the above range of KB.

Now, a minus temporary connection exists in a plus pattern while a plus temporary connection exists in a minus pattern. The temporary connections are sequentially numbered and data thereof are stored in the RAM 3.

In FIG. 10, there are provided multiple patterns regarding "KB=±0.04(dB)", specifically, one plus pattern P1 and three minus patterns P2, P3 and P4. Those patterns respectively correspond to patterns SP1, SP2, SP3 and SP4 which are shown in FIGS. 7A, 7B and 8.

Further, a decision is made, using a detection value of "NB+NP/2" for a pattern width, as to whether or not the pattern corresponds to noise component. If the pattern width is smaller than the above detection value, it is determined that the pattern corresponds to the noise component; and consequently, elimination of noise is performed on the pattern.

Figure 11:
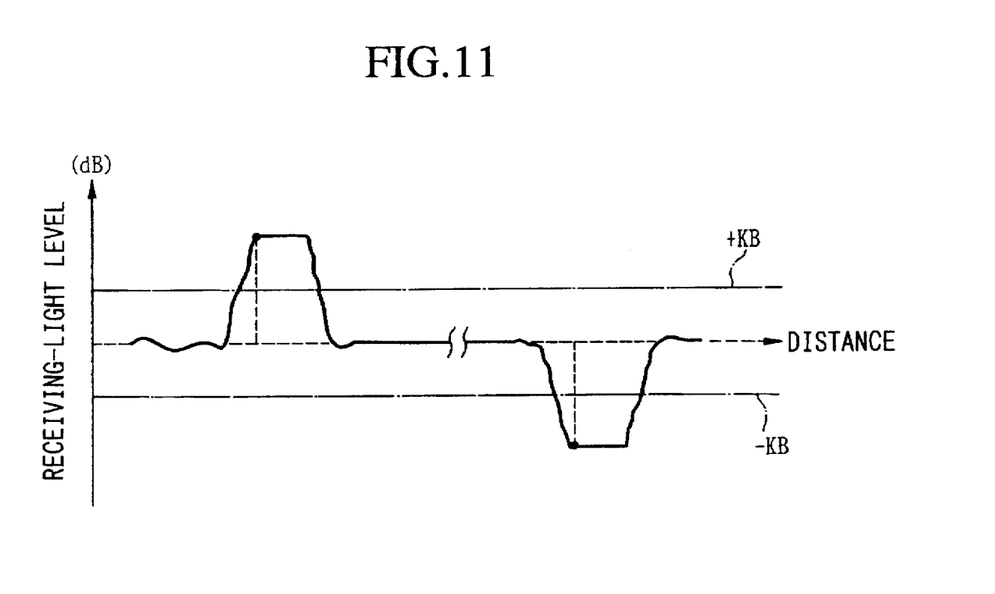
FIG. 11 shows a selected part of the waveform of FIG. 10 which is used to explain a method of determining a temporary connection.

Next, the CPU 2 detects a maximum value and its location (i.e., point) in each of the patterns of the mean difference waveform. FIG. 11 shows a part of the mean difference waveform 13d indicating locations which are determined as temporary connections 14.

The temporary connections are numbered by 1, 2, 3, . . . , r, so that locations of the temporary connections are correspondingly designated by SP(1), SP(2), SP(3), . . . . SP(r).

Figure 12:
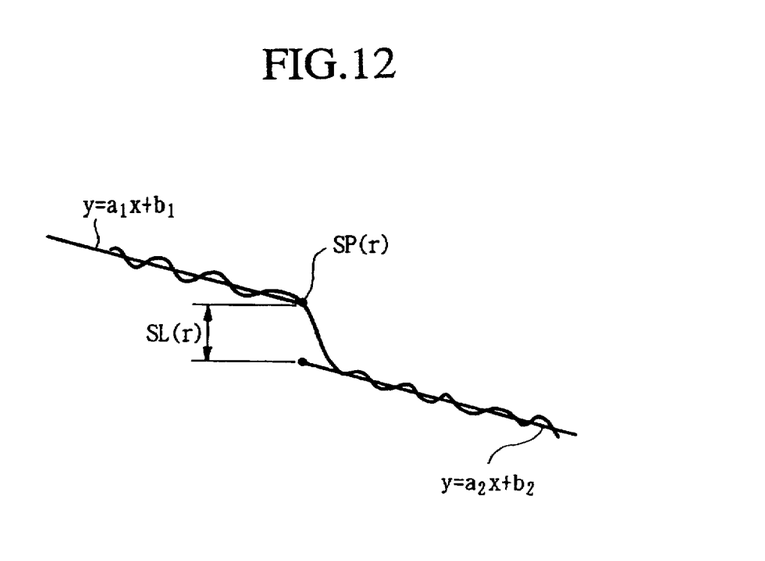
FIG. 12 shows a selected part of a waveform which is used to explain a calculation method of calculating connection loss with respect to a temporary connection.

Next, the CPU 2 proceeds to step Sa8 so as to calculate connection loss for each temporary connection by using original waveform data y(k). FIG. 12 shows a selected part of a waveform which is used to explain a calculation method to calculate connection loss for the temporary connection SP(r), wherein the waveform is divided into two parts, with respect to the temporary connection SP(r), which are called a left-side section and a right-side section of the waveform.

At first, approximate lines are calculated for the left-side section and right-side section of the waveform respectively. Now, a rise-up point and a fall-down point of Fresnel reflection are designated by 'PKSu' and 'PKSd' respectively. Those points are used to determine a range of data for approximate-line processing. As for the left-side section of the waveform, a square-law approximate line, represented by "y=a₁x+b1", is calculated using a range of data which is determined as follows: (1) First condition where Fresnel reflection occurs between SP(r) and SP(r−1):

(a) In the case of SP(r)−PKSd>300, a range of data is set as [SP(r)−300, SP(r)].

(b) In the case of SP(r)−PKSd≦300, a range of data is set as [PKSd, SP(r)].

(2) Second condition where Fresnel reflection does not occur between SP(r) and SP(r−1):

(a) In the case of SP(r)−SP(r−1)>300+NP, a range of data is set as [SP(r)−300, SP(r)].

(b) In the case of SP(r)−SP(r−1)≦300+NP, a range of data is set as [SP(r−1)+NP, SP(r)].

As for the right-side section of the waveform, a square-law approximate line, represented by "y=a₂x+b₂", is calculated using a range of data which Is determined as follows:

(1) First condition where Fresnel reflection occurs between SP(r) and SP(r+1):

(a) In the case of PKSu-SP(r)−NP>300, a range of data is set as [SP(r)+NP, SP(r)+NP+300].

(b) In the case of PKSu-SP(r)−NP≦300, a range of data is set as [SP(r)+NP, PKSu].

(2) Second condition where Fresnel reflection does not occur between SP(r) and SP(r+1):

(a) In the case of SP(r+1)−SP(r)−NP>300, a range of data is set as [SP(r)+NP, SP(r)+NP+300].

(b) In the case of SP(r)−SP(r−1)−NP≦300, a range of data is set as [SP(r)+NP, SP(r+1)].

Moreover, the CPU 2 calculates connection loss SL(r) with respect to the connection SP(r) in accordance with an equation, as follows:

$$SL(r)=a_1 \cdot SP(r)+b_1-(a_2 \cdot sp(r)+b_2) \quad (9)$$

Then, the CPU 2 compares the result of calculation of the equation (9) with the aforementioned value of KB so as to make a decision as to whether or not a temporary connection is a real connection. Herein, if SP(r)≧KB, the CPU 2 determines that the temporary connection is the real connection. If SL(r)<KB, the CPU 2 determines that the temporary connection corresponds to noise.

Lastly, the CPU 2 creates data representing locations and connection loss for all the connections which are calculated by the aforementioned processes; then, the data are stored in the RAM 3 in step Sa9.

The data, which are automatically created by the CPU 2, are written into the external store device 5 in a predetermined store format in accordance with manipulation of the key panel 10.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds are therefore intended to be embraced by the claims.

What is claimed is:

1. An optical fiber testing method which supplies light pulses to a measuring optical fiber so as to receive return light, consisting of back-scattering light and Fresnel-reflection light outputted from the measuring optical fiber, so that testing for the measuring optical fiber is performed based on a waveform representing the return light, comprising the steps of:

setting a start point for detection of a connection of the measuring optical fiber at a specific location of a waveform, representing return light outputted from the measuring optical fiber, wherein the specific location corresponds to a near end of the measuring optical fiber;

partitioning a detection range of the waveform, defined by the start point and an end point, into a plurality of regions in connection with Fresnel-reflection space, wherein each region is used for detection of the connection;

calculating at least a noise index and a constant with respect to each region;

performing HOUGH conversion on each region of the waveform;

performing center-value filtering process using the constant with respect to each region of the waveform so as to create a filtered waveform;

performing mean difference process on the filtered waveform so as to create a mean difference waveform;

detecting a location of the mean difference waveform, whose level exceeds a predetermined range, as a location of a temporary connection;

calculating approximate lines with respect to a left-side section and a right-side section of the temporary connection on the mean difference waveform;

calculating a connection loss for the temporary connection based on the approximate lines; and determining whether or not the temporary connection indicates a real connection on the basis of the connection loss.

2. An optical fiber testing method as defined in claim 1 wherein a differentiation process is performed 2 times on the waveform so that a level of the differentiated waveform becomes lower than a predetermined level at the specific location which is set as the start point.

3. An optical fiber testing method as defined in claim 1 wherein if a region contains points which are greater than a predetermined number of points, the region is further partitioned into a plurality of regions.

4. An optical fiber testing method as defined in claim 1 wherein each of the plurality of regions is determined by excluding a portion, corresponding to the Fresnel-reflection space, from the waveform.

5. An optical fiber testing method as defined in claim 1 wherein a decision is made, using a threshold value which is determined in advance, as to whether the temporary connection indicates the real connection or noise.

* * * * *